(12) United States Patent
Russell

(10) Patent No.: US 12,000,759 B2
(45) Date of Patent: Jun. 4, 2024

(54) SHAKING DEVICE

(71) Applicant: RUSSELL INNOVATIONS PTY LTD, Haberfield (AU)

(72) Inventor: Adrian Russell, Haberfield (AU)

(73) Assignee: RUSSELL INNOVATIONS PTY LTD, Haberfield (AU)

( * ) Notice: Subject to any disclaimer, the term of this patent is extended or adjusted under 35 U.S.C. 154(b) by 1133 days.

(21) Appl. No.: 16/633,944

(22) PCT Filed: Jun. 8, 2018

(86) PCT No.: PCT/AU2018/050570
§ 371 (c)(1),
(2) Date: Jan. 24, 2020

(87) PCT Pub. No.: WO2019/018878
PCT Pub. Date: Jan. 31, 2019

(65) Prior Publication Data
US 2020/0219417 A1    Jul. 9, 2020

(30) Foreign Application Priority Data
Jul. 27, 2017  (AU) ............................... 2017902966
Oct. 30, 2017  (AU) ............................... 2017904379

(51) Int. Cl.
| | |
|---|---|
| *G01M 7/02* | (2006.01) |
| *B06B 1/12* | (2006.01) |
| *G01M 7/00* | (2006.01) |
| *G01M 7/06* | (2006.01) |
| *G09B 9/00* | (2006.01) |
| *G09B 23/40* | (2006.01) |

(52) U.S. Cl.
CPC ................. *G01M 7/02* (2013.01); *B06B 1/12* (2013.01); *G01M 7/00* (2013.01); *G01M 7/06* (2013.01); *G09B 9/00* (2013.01); *G09B 23/40* (2013.01)

(58) Field of Classification Search
CPC . G01M 7/02; G01M 7/00; G01M 7/06; B06B 1/12; G09B 9/00; G09B 23/40
USPC ........................................................... 73/663
See application file for complete search history.

(56) References Cited

U.S. PATENT DOCUMENTS

2016/0076966 A1*  3/2016  Khulief ................... G01M 7/06
                                                                    73/663

FOREIGN PATENT DOCUMENTS

| CN | 101 887 193 A | 11/2010 |
|---|---|---|
| CN | 101877193 A | 11/2010 |
| CN | 101887193 A | 11/2010 |
| CN | 104021718 A | 9/2014 |

(Continued)

OTHER PUBLICATIONS

European Search Report in related European application 18837905.1 dated Feb. 15, 2021.

(Continued)

*Primary Examiner* — Peter J Macchiarolo
*Assistant Examiner* — Rose M Miller
(74) *Attorney, Agent, or Firm* — Pillsbury Winthrop Shaw Pittman, LLP

(57) ABSTRACT

The present invention relates to shaking devices and in particular to shaking devices for use in earthquake simulations. The shaking devices may be capable of imposing movement along more than one axis. Those skilled in the art will understand that the devices described herein have a broad range of applications.

16 Claims, 5 Drawing Sheets

(56) References Cited

FOREIGN PATENT DOCUMENTS

| | | | | | |
|---|---|---|---|---|---|
| CN | 105 500 348 | A | | 4/2016 | |
| CN | 105500348 | A | | 4/2016 | |
| CN | 205454670 | U | * | 8/2016 | |
| CN | 205826256 | U | * | 12/2016 | |
| CN | 106335853 | A | * | 1/2017 | ............ B66F 7/0658 |
| JP | S54151060 | A | | 11/1979 | |
| JP | 2000 288257 | A | | 10/2000 | |
| JP | 2000288257 | A | | 10/2000 | |
| TW | I 592 349 | B | | 7/2017 | |
| TW | I592349 | B | | 7/2017 | |
| WO | 01/52958 | A1 | | 7/2001 | |
| WO | 2010106672 | A1 | | 9/2010 | |
| WO | 2017033707 | A1 | | 3/2017 | |

OTHER PUBLICATIONS

International Search Report in related International Application No. PCT/AU2018/050570 dated Sep. 3, 2018 (4 pages).
Written Opinion in related International Application No. PCT/AU2018/050570 dated Sep. 3, 2018 (4 pages).
Office Action in related Chinese Patent Application dated May 25, 2021, 12 pages with English translation on pp. 1 to 4.

* cited by examiner

SHAKING DEVICE

CROSS-REFERENCE TO RELATED APPLICATIONS

This patent application is a national phase of PCT/AU2018/050570 filed Jun. 8, 2018, which claims priority to Australian application no. 2017902966 filed Jul. 27, 2017 and Australian application no. 2017904379 filed Oct. 30, 2017. The entire content of each aforementioned patent filing is hereby incorporated by reference.

FIELD OF THE INVENTION

The present invention relates to shaking devices and in particular to shaking devices for use in earthquake simulations.

BACKGROUND OF THE INVENTION

Any discussion of the prior art throughout the specification should in no way be considered as an admission that such prior art is widely known or forms part of the common general knowledge in the field.

Shaking devices are useful tools for structural dynamic studies and durability testing, as well as studies of how geomaterials behave and/or interact with structures and other objects during shaking. They are commonly used to assess the ability of structures such as buildings and bridges to withstand the complex forces imparted by an earthquake. During an earthquake, the ground can move horizontally along x and y axes, as well as vertically along the z axis. Rotational movements about each of these axis can also occur such that ground movement during an earthquake occurs across all six degrees of freedom (DOF).

Earthquake-simulating shaking devices may simulate movement across one or more degree of freedom. Single-axis simulators may be relatively inexpensive to manufacture, but are limited in their ability to provide accurate or meaningful simulations since the earth's crust does not move along a single axis. Single-axis simulators are particularly poorly suited to geotechnical studies of geomaterials (eg, soils, tailings) where the vertical component of seismic motion plays an important role such as soil-foundation interactions, earthworks and retaining structures. In contrast to single-axis simulators, 6-DOF simulators can be programmed to provide movements that more accurately simulate a real earthquake. However, each additional degree of freedom greatly adds to the cost and complexity of production, operation and function of the earthquake simulator.

In this context, there is a need for alternative shaking devices that are capable of imposing movement along more than one axis. It is an object of the present invention to overcome or ameliorate at least one of the disadvantages of the prior art or to provide a useful alternative.

SUMMARY OF THE INVENTION

In a first aspect, the present invention provides a shaking device comprising:
  a base;
  a lower support platform slideably mounted to the base;
  an upper support platform slideably mounted to the lower support platform;
  stage moveably disposed above the upper support platform; and
  a pair of scissor arms connecting the stage to the upper support platform and the lower support platform.

In one or more embodiments, the pair of scissor arms comprises:
  a first scissor arm rotatably connected to the upper support platform and rotatably connected to the stage; and
  second scissor arm rotatably connected to the lower support platform and rotatably connected to the first scissor arm at a position between the upper support platform and the stage.

In further embodiments, the pair of scissor arms comprises:
  a first scissor arm rotatably connected to the lower support platform and rotatably connected to the stage; and
  a second scissor arm rotatably connected to the upper support platform and rotatably connected to the first scissor arm at a position between the upper support platform and the stage.

Preferably, the shaking device comprises more than one pair of scissor arms.

The shaking device may comprise more than one laterally spaced pair of scissor arms rotatably connected to opposing sides of the stage.

The base may comprise a plurality of laterally spaced guides for guiding longitudinal sliding movement of the lower support platform.

The lower support platform may comprise a plurality of laterally spaced guides for guiding longitudinal sliding movement of the upper support platform.

The guides may be selected from the group consisting of guide rails, round shafts, ball screws, modular slide units, motions slide packs and ball splines.

The guides are preferably in the form of guide rails.

The shaking device may further comprise a lower actuator for driving longitudinal sliding movement of the lower support platform.

The shaking device may further comprise an upper actuator for driving longitudinal sliding movement of the upper support platform.

In a second aspect, the present invention provides a shaking device comprising:
  a base;
  a lower support platform slideably mounted to the base;
  an upper support platform slideably mounted to the base;
  a stage moveably disposed above the upper support platform; and
  a pair of scissor arms connecting the stage to the upper support platform and the lower support platform.

In one or more embodiments, the pair of scissor arms comprises:
  a first scissor arm rotatably connected to the upper support platform and rotatably connected to the stage; and
  a second scissor arm rotatably connected to the lower support platform and rotatably connected to the first scissor arm at a position between the upper support platform and the stage.

In further embodiments, the pair of scissor arms comprises:
  a first scissor arm rotatably connected to the lower support platform and rotatably connected to the stage;
  a second scissor arm rotatably connected to the upper support platform and rotatably connected to the first scissor arm at a position between the upper support platform and the stage.

The shaking device may comprise more than one pair of scissor arms.

Preferably, the shaking device comprises more than one laterally spaced pair of scissor arms rotatably connected to opposing sides of the stage.

The base may comprise a pair of laterally spaced guides for guiding longitudinal sliding movement of the lower support platform.

The base may comprise a plurality of laterally spaced guides for guiding longitudinal sliding movement of the lower support platform and the upper support platform.

The guides may be selected from the group consisting of guide rails, round shafts, ball screws, modular slide units, motions slide packs and ball splines.

The guides are preferably in the form of guide rails.

The shaking device may further comprise a lower actuator for driving longitudinal sliding movement of the lower support platform.

The shaking device may further comprise an upper actuator for driving longitudinal sliding movement of the upper support platform.

BRIEF DESCRIPTION OF DRAWINGS

Embodiments of the invention will now be described by way of example only with reference to the accompanying drawings, in which.

DETAILED DESCRIPTION OF AN EMBODIMENT OF THE INVENTION

Figure 1:
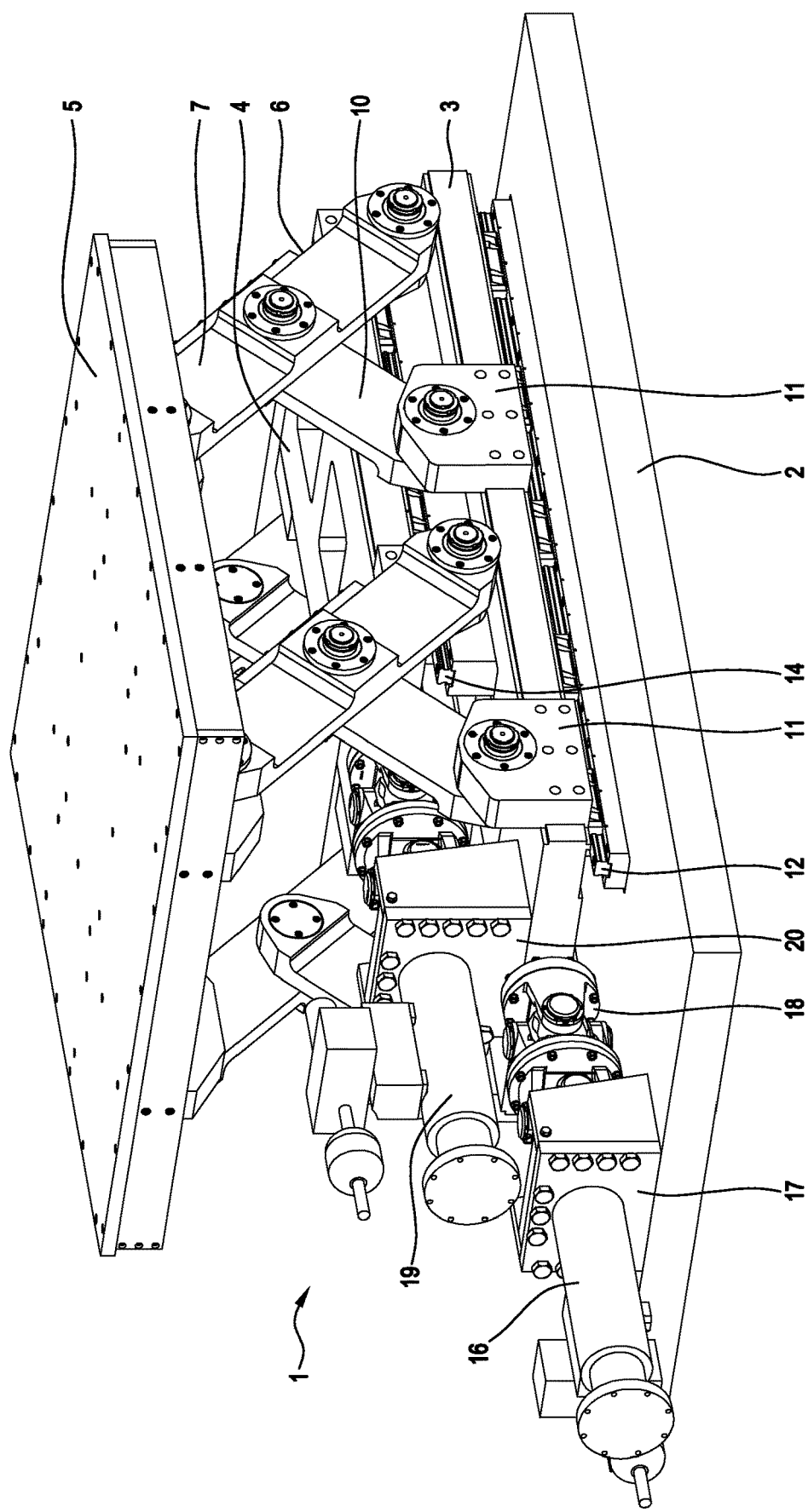
FIG. 1 is a perspective view of a shaking device according to the present invention.
Figure 2:
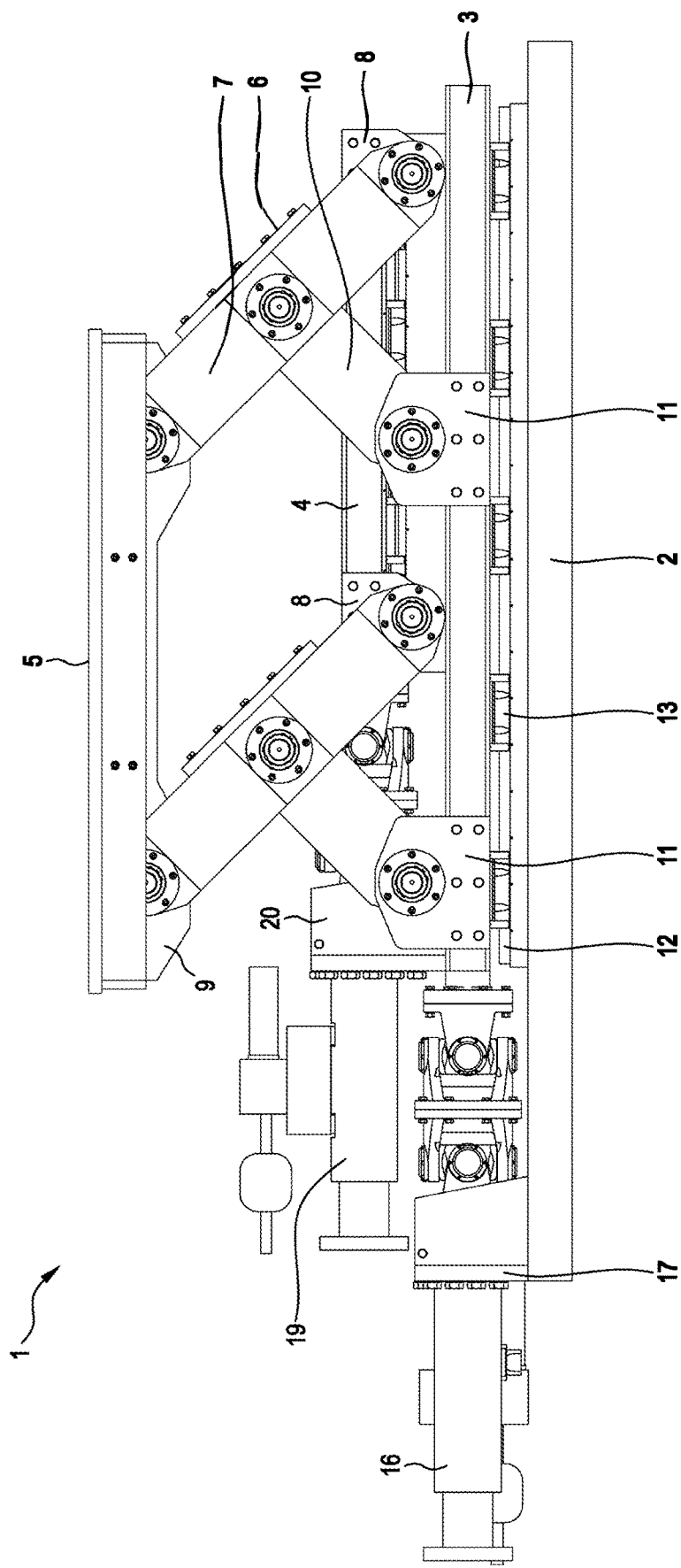
FIG. 2 is a side elevation view of the shaking device.

Referring to the drawings, there is provided a shaking device 1 comprising a base 2, a lower support platform 3 slideably mounted to the base, an upper support platform 4 slideably mounted to the lower support platform, a stage 5 moveably disposed above the upper support platform and a pair of scissor arms 6 connecting the stage to the upper support platform and the lower support platform. It will be seen that longitudinal sliding movement of one support platform provides horizontal movement of stage 5, while longitudinal sliding movement of the other support platform is translated to vertical movement of the stage by way of scissor arms 6 (sometimes referred to as Scott Russell linkage). Accordingly, specimens mounted to stage 5 are subjected to movement along more than one axis in two orthogonal planes. Those skilled in the art will understand that the stage may take several different forms.

As shown in FIG. 1, shaking device 1 comprises four laterally spaced pairs of scissor arms 6 connected to opposing sides of stage 5. Each pair of scissor arms 6 comprises a first scissor arm 7 rotatably connected to upper support platform 4 by boss 8 and rotatably connected to stage 5 by boss 9, and a second scissor arm 10 rotatably connected to lower support platform 3 by boss 11 and rotatably connected to the first scissor arm at a position between the upper support platform and the stage. Those skilled in the art will understand, however, that alternative configurations of the scissor arms will also provide movement along two orthogonal planes. For example, first scissor arm 7 may be rotatably connected to lower support platform 3 and to stage 5 while second scissor arm 10 may be rotatably connected to upper support platform 4 and to the first scissor arm. Each arm in the pair of scissor arms may be a single unit or it may be comprised of more than one component that is assembled to form the arm.

Figure 3A:
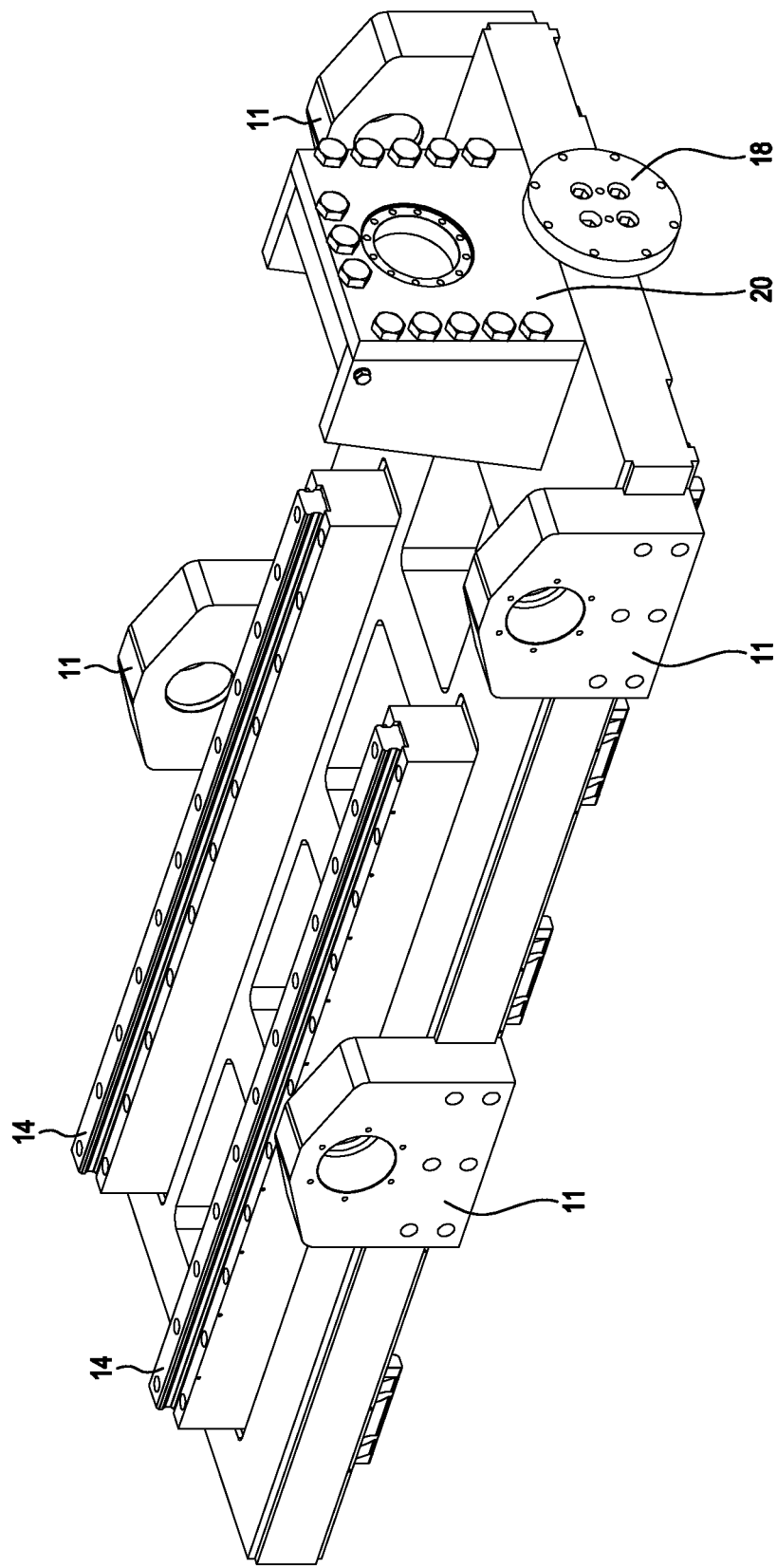
FIG. 3 is a perspective view of a lower support platform according to the present invention.
Figure 3B:
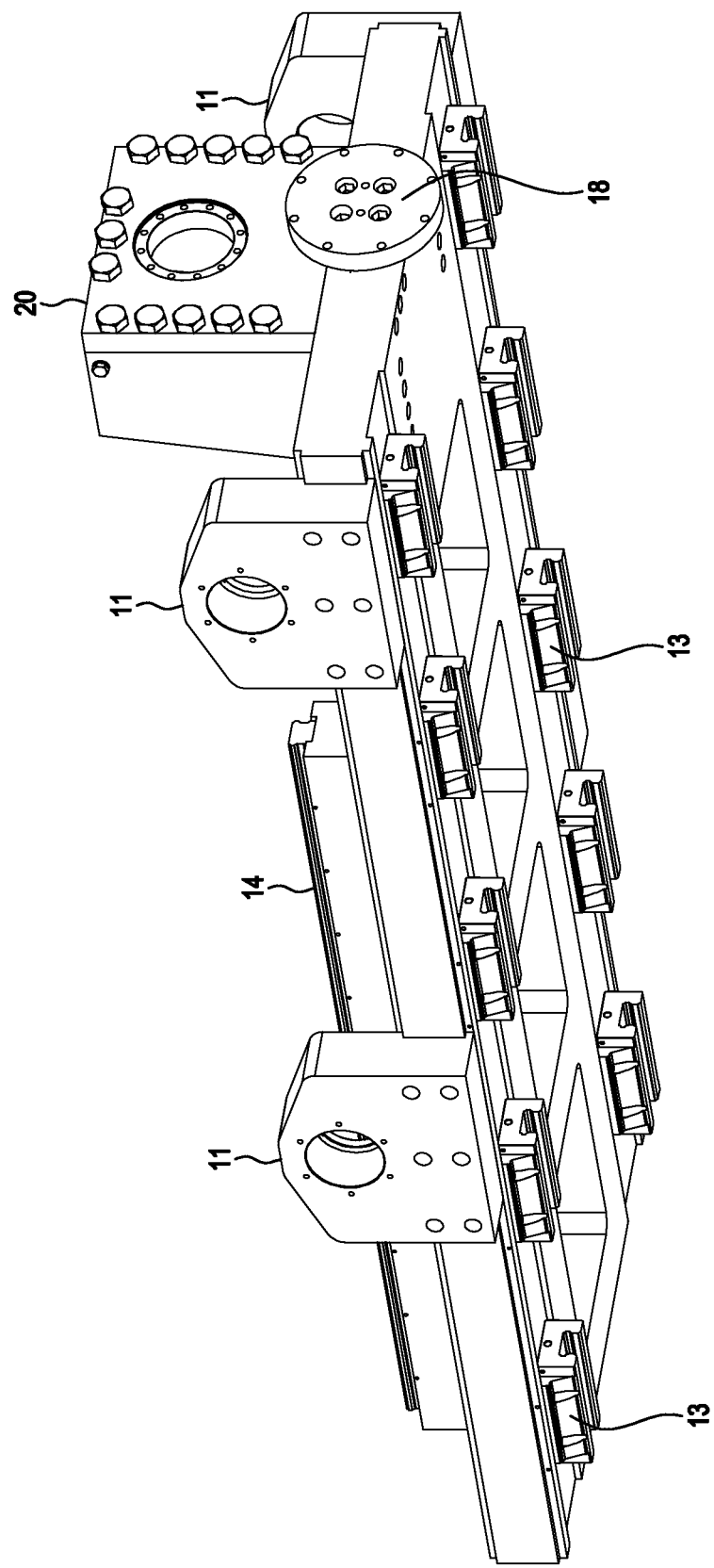
Figure 4:
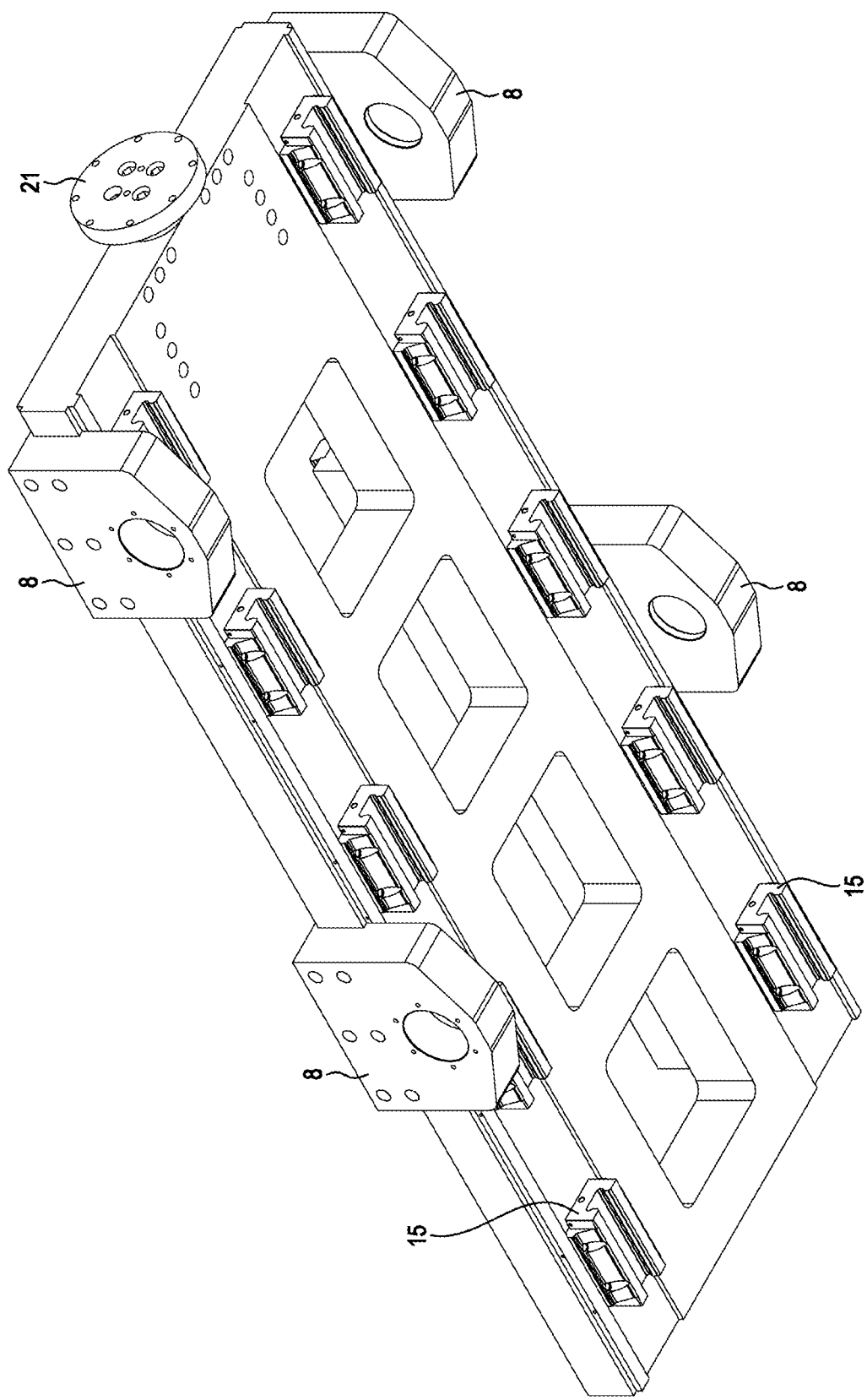
FIG. 4 is a perspective view of an upper support platform according to the present invention.

Lower support platform 3 slides in a longitudinal direction along base 2, guided by a plurality of laterally spaced guides in the form of guide rails 12. Those skilled in the art will understand that other guides may also be used including round shafts, ball screws, modular slide units, motion slide packs or ball splines. Referring to FIG. 3, lower support platform 3 comprises a plurality of slide carriages 13 for mutual captive engagement with guide rails 12. Upper support platform 4 slides in a longitudinal direction along lower support platform 3, guided by a plurality of laterally spaced guide rails 14 fixed to the lower support platform. Referring to FIG. 4, upper support platform 4 comprises a plurality of slide carriages 15 for mutual captive engagement with guide rails 14. It will be understood, however, that guide rails 14 may also guide longitudinal sliding movement of upper support platform 4 when present on base 2. In that embodiment, both lower support platform 3 and upper support platform 4 are slideably mounted to base 2.

Shaking device 1 may be fitted with one or more horizontally aligned actuators which actuate reciprocating linear sliding movement along the longitudinal axis of the shaking device. Lower actuator 16 is fixed to base 2 by bracket 17 and connects to lower support platform 3 by way of flange connector 18 to drive longitudinal sliding movement of the lower support platform along guide rails 12. Upper actuator 19 is fixed to lower support platform 3 by bracket 20 and connects to upper support platform 4 by way of flange connector 21 to drive longitudinal sliding movement of the upper support platform along guide rails 14. Those skilled in the art will understand that lower actuator 16 need not be fixed to base 2 and that upper actuator 19 need not be fixed to lower support platform 3, as long as each is capable of actuating reciprocal linear sliding movement of respective sliding platforms. Several different types of actuator may be suitable for use in the present invention. The actuator may be, for example, a hydraulic actuator, a pneumatic actuator, an electric actuator, a thermal actuator, a magnetic actuator, a screw-type actuator, a vacuum actuator, a linear motor, a comb drive, an electric motor, a screw jack or a rotary motor.

For specific applications of the shaking device, it may be desirable to restrict movement to a single axis. In that regard, the shaking device may be adjusted to provide reciprocating movement along either a horizontal plane, a vertical plane or both. In some embodiments, lower support platform 3 and upper support platform 4 reciprocate at different rates thereby providing movement of stage 5 along both a horizontal plane and a vertical plane. In other embodiments, the actuators may be programmed to provide single-axis movement of stage 5 along a horizontal plane. In further embodiments, the actuators may be programmed to provide single-axis movement of stage 5 along a vertical plane. In still further embodiments, scissor arms 6 may be fixedly connected to shaking device 1, and to each other, thereby providing single-axis movement of stage 5 along a horizontal plane. For example, scissor arms 6 may be fitted with a locking mechanism which enables the scissor arms to be locked into a fixed connection with the shaking device and with each other. The locking mechanism may be reversible such that, when unlocked, the stage is able to move along a horizontal plane and a vertical plane.

It will be understood that the shaking device 1, can be mounted at any desired angle. For example, the shaking device may sit flat on the ground or it may be mounted to a wall or the side of an excavation.

It will also be understood that shaking device 1, while suitable for use in simulating earthquakes, is not limited to that use. The shaking device may be used, for example, to conduct vibration tests on automobiles, aircrafts, mechanical or electrical parts and the like. The shaking device may also be used for mixing solutions, such as chemical solutions or cell cultures in a laboratory.

The terms "comprise", "comprises", "comprised" or "comprising", "including" or "having" and the like in the present specification and claims are used in an inclusive sense, ie, to specify the presence of the stated features but not preclude the presence of additional or further features.

The term "about" as used in connection with geometric dimensions in the specification and claims is to be understood as indicating a range of +/−10%, preferably +/−5% or, more preferably, +/−1%.

In the context of this specification the terms "a" and "an" are used herein to refer to one or to more than one (i.e. to at least one) of the grammatical object of the article. By way of example, "an element" means one element or more than one element.

Although the invention has been described with reference to specific embodiments, it will be appreciated by those skilled in the art that the invention may be embodied in many other forms.

The invention claimed is:

1. A shaking device comprising:
a base;
a lower support platform slidably mounted to the base;
an upper support platform slidably mounted to the lower support platform;
a stage moveably disposed above the upper support platform; and
a pair of scissor arms connecting the stage to the upper support platform and the lower support platform, wherein the pair of scissor arms comprises:
a first scissor arm rotatably connected to one of the upper support platform or the lower support platform, and rotatably connected to the stage; and
a second scissor arm rotatably connected to the upper support platform if the first scissor arm is rotatably connected to the lower support platform or the lower support platform if the first scissor arm is rotatably connected to the upper support platform, and rotatably connected to the first scissor arm at a position between the upper support platform and the stage.

2. The shaking device according to claim 1 wherein the shaking device comprises more than one pair of scissor arms.

3. The shaking device according to claim 2 wherein the shaking device comprises more than one laterally spaced pair of scissor arms rotatably connected to opposing sides of the stage.

4. The shaking device according to claim 1 wherein the base comprises a plurality of laterally spaced guides for guiding longitudinal sliding movement of the lower support platform.

5. The shaking device according to claim 4 wherein the guides are in the form of guide rails.

6. The shaking device according to claim 1 wherein the lower support platform comprises a plurality of laterally spaced guides for guiding longitudinal sliding movement of the upper support platform.

7. The shaking device according to claim 1 further comprising a lower actuator for driving longitudinal sliding movement of the lower support platform.

8. The shaking device according to claim 1 further comprising an upper actuator for driving longitudinal sliding movement of the upper support platform.

9. A shaking device comprising:
a base;
a lower support platform slidably mounted to the base; an upper support platform slidably mounted to the base;
a stage moveably disposed above the upper support platform; and
a pair of scissor arms connecting the stage to the upper support platform and the lower support platform, wherein the pair of scissor arms comprises:
a first scissor arm rotatably connected to one of the upper support platform and the lower support platform, and rotatably connected to the stage; and
a second scissor arm rotatably connected to the other of the upper support platform and the lower support platform, and rotatably connected to the first scissor arm at a position between the upper support platform and the stage.

10. The shaking device according to claim 9 wherein the shaking device comprises more than one pair of scissor arms.

11. The shaking device according to claim 10 wherein the shaking device comprises more than one laterally spaced pair of scissor arms rotatably connected to opposing sides of the stage.

12. The shaking device according to claim 9 wherein the base comprises a pair of laterally spaced guides for guiding longitudinal sliding movement of the lower support platform.

13. The shaking device according to claim 12 wherein the guides are in the form of guide rails.

14. The shaking device according to claim 9 wherein the base comprises a plurality of laterally spaced guides for guiding longitudinal sliding movement of the lower support platform and the upper support platform.

15. The shaking device according to claim 9 further comprising a lower actuator for driving longitudinal sliding movement of the lower support platform.

16. The shaking device according to claim 9 further comprising an upper actuator for driving longitudinal sliding movement of the upper support platform.

* * * * *